US006981914B2

(12) United States Patent  
Veenstra (10) Patent No.: US 6,981,914 B2  
(45) Date of Patent: Jan. 3, 2006

(54) SOFT TOP REAR SIDE FLAP VENT FOR UTILITY VEHICLE

(76) Inventor: Roger L. Veenstra, 915 Nameoki Cir., Crossville, TN (US) 38572

( * ) Notice: Subject to any disclaimer, the term of this patent is extended or adjusted under 35 U.S.C. 154(b) by 270 days.

(21) Appl. No.: 10/691,524

(22) Filed: Oct. 24, 2003

(65) Prior Publication Data

US 2005/0095975 A1    May 5, 2005

(51) Int. Cl.  
*B60H 1/24* (2006.01)
(52) U.S. Cl. ......................................... 454/164; 135/94
(58) Field of Classification Search ................ 454/118, 454/162, 164, 165; 296/98; 135/93, 94
See application file for complete search history.

(56) References Cited

U.S. PATENT DOCUMENTS

| 1,433,260 | A | * | 10/1922 | Coleman | .................... 454/165 |
| 2,585,220 | A | * | 2/1952 | Brezek | ...................... 180/68.1 |
| 3,164,078 | A | * | 1/1965 | Hung | ......................... 454/271 |
| 3,259,051 | A | | 7/1966 | Boche et al. | |
| 3,520,243 | A | | 7/1970 | Wessells, III | |
| 4,537,115 | A | * | 8/1985 | Haesters | ..................... 454/165 |
| 6,042,473 | A | | 3/2000 | McClary et al. | |
| 6,435,961 | B1 | * | 8/2002 | Biancone | .................... 454/164 |
| 6,468,149 | B2 | | 10/2002 | Essig et al. | |

* cited by examiner

*Primary Examiner*—Harold Joyce  
(74) *Attorney, Agent, or Firm*—Richard C. Litman (57) ABSTRACT

A removably insertable rear cabin air vent for installation between the rear side flap and the rear wall of the soft top of an off road or utility vehicle. The vent is inserted and held in place between the rear sidewall flap and the rear of the soft top by any known means such as by sewing and adhesives. Certain soft have a zipper attaching the sidewall flap to the soft top and, have an overlapping flap outside the zipper which is held in place by mutually engaging strips of hook and loop material.

The preferred means of attaching the vent is by placing hook and loop material along the outer surfaces of the vent which match with the existing strips in the sidewall flap and soft top, allowing for the removable insertion of the vent between the existing strips of hook and loop material in a desired location.

20 Claims, 8 Drawing Sheets

SOFT TOP REAR SIDE FLAP VENT FOR UTILITY VEHICLE

BACKGROUND OF THE INVENTION

1. Field of the Invention

The present invention relates to air vents. More particularly, the present invention relates to an exit air vent attachable at the rear side flap of a soft top of a utility vehicle.

2. Description of the Related Art

It is well known to install exit air vents near the rear of the cabin of a passenger car or the like to promote fresh air flow through the cabin introduced near the cabin front, such as through a heater/blower system. This allows for fresh air flow while at least the rear windows of the vehicle are closed. Such exit air vents also minimize the swirling of air in the passenger cabin when the front windows of the vehicle are open. In the case of a soft or convertible top for an off-road or utility vehicle such as a Jeep Wrangler, no provision has been made for the exit of air introduced through the heating/ventilation system or through open front door windows or passageways. This is would be a desirable feature, particularly during travel at highway speeds, reducing buffeting of passengers with swirling air and the movement of articles stored in the rear cabin area. It would be desirable to provide a removable rear cabin vent attachment for such vehicles which is easily installed or removed from the vehicle as it is commercially equipped. Such a vent would preferably be located near the rear of the vehicle cabin without any modification to the standard soft or convertible top with which the vehicle is provided. Such a vent would preferably be removable without leaving evidence of its use when one sells the vehicle and the vent could be moved to a new vehicle of similar design.

U.S. Pat. No. 6,468,149 B1, issued Oct. 22, 2002, to Essig et al., describes a hardtop for an off road utility vehicle having rear cabin air vents as part of the hardtop's permanent construction.

U.S. Pat. No. 6,042,473, issued Mar. 28, 2000, to McClary et al. describes a ventilating panel insertable between the front window of the cabin of an automobile and the window frame which may be removably installed.

U.S. Pat. No. 3,520,243, issued Jul. 14, 1970, to Wessells, III, describes a rear cabin air vent for a vehicle permanently built into the rear cabin post to allow air flow through the cabin of the vehicle.

U.S. Pat. No. 3,259,051, issued Jul. 5, 1966, to Boche et al., also describes a rear cabin air vent for a vehicle permanently built into the rear cabin post to allow air flow through the cabin of the vehicle.

None of the above inventions and patents, taken either singly or in combination, is seen to describe the instant invention as claimed. Thus, soft top side window vents for utility vehicles such as Jeep Wranglers solving the aforementioned problems is desired.

SUMMARY OF THE INVENTION

The present invention is a removably insertable rear cabin air vent for installation between the rear side flap and the rear wall of the soft top of an off road or utility vehicle. When such a vehicle is driven at any substantial speed with the front windows or openings in the open position, wind is swirled in the rear portion of the cabin, making rear passengers uncomfortable and moving light weight articles around the cabin. Also, when the front openings are closed, but fresh air or heated air is introduced through the ventilation system of the vehicle, a rear cabin air vent is desirable to provide a flow of fresh air through the cabin.

The inventive vent may be inserted and held in place between the rear sidewall flap and the rear of the soft top by any known means such as by sewing and adhesives. Certain soft tops such as that of the Jeep Wrangler have a zipper for removably attaching the sidewall flap to the soft top and, for protection of the zipper an overlapping flap is provided outside the zipper which is held in place by mutually engaging strips of hook and loop material such as Velcro.

A preferred means of attaching the inventive vent is by placing hook and loop material along the outer surfaces of the vent which match with the existing strips in the sidewall flap and soft top, allowing for the removable insertion of the inventive air vent between the existing strips of hook and loop material in a desired location. The preferred location is along the rear vertical attachment of the sidewall flap and the soft top. The vent is preferably of such a length as to extend the substantial vertical length of the vertical attachment and of such size as to avoid unnecessary bulging out of the side flap and the soft top rear wall, preferably about one inch.

The vent preferably includes downward, rearwardly directed louvers to minimized the entry of rain water into the cabin and may have a screen installed on its inner side to exclude insects. The vent structure is preferably equal in thickness to the width of the existing flap strips. In the case of the Jeep vehicle, this is one inch in thickness, i.e., the length between front air intake side and rear air exit side. The vent may easily be removed, leaving no evidence on the soft top or side flap of the inventive vent having been installed. A similar, mirror image design vent may be installed on the opposite rear side of the vehicle if desired.

Accordingly, it is a principal object of the invention to provide a rear cabin air vent for a utility vehicle having a soft top.

It is another object of the invention to provide a rear cabin air vent for a utility vehicle as above which is removably installed within the soft top structure.

It is a further object of the invention to provide a rear cabin air vent for a utility vehicle as above which fits between the rear top wall and the rear side flap of the soft top.

Still another object of the invention is to provide a rear cabin air vent as above which is removably installed employing hook and loop material connecting with existing hook and loop material on the soft top and flap.

Yet another object of the invention is to provide a rear cabin air vent as above which is removable without permanent indication of its installation on the vehicle.

Still another object of the invention is to provide a rear cabin air vent which provides for exit of swirling air within the cabin and provides for cooling ventilation when the vehicle is parked and secured in warm weather.

Yet another object of the invention is to provide a relatively large air vent which is effective in venting air from the cabin while keeping out rain by the incorporation of fixed louvers.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a removably insertable rear cabin air vent for installation between the rear side flap and the rear wall of the soft top of an off road or utility vehicle. The vent is inserted and held in place between the rear sidewall flap and the rear of the soft top by any known means such as by sewing and adhesives. Certain soft have a zipper attaching the sidewall flap to the soft top and, have an overlapping flap outside the zipper which is held in place by mutually engaging strips of hook and loop material.

The preferred means of attaching the vent is by placing hook and loop material along the outer surfaces of the vent which match with the existing strips in the sidewall flap and soft top, allowing for the removable insertion of the vent between the existing strips of hook and loop material in a desired location.

Figure 1:
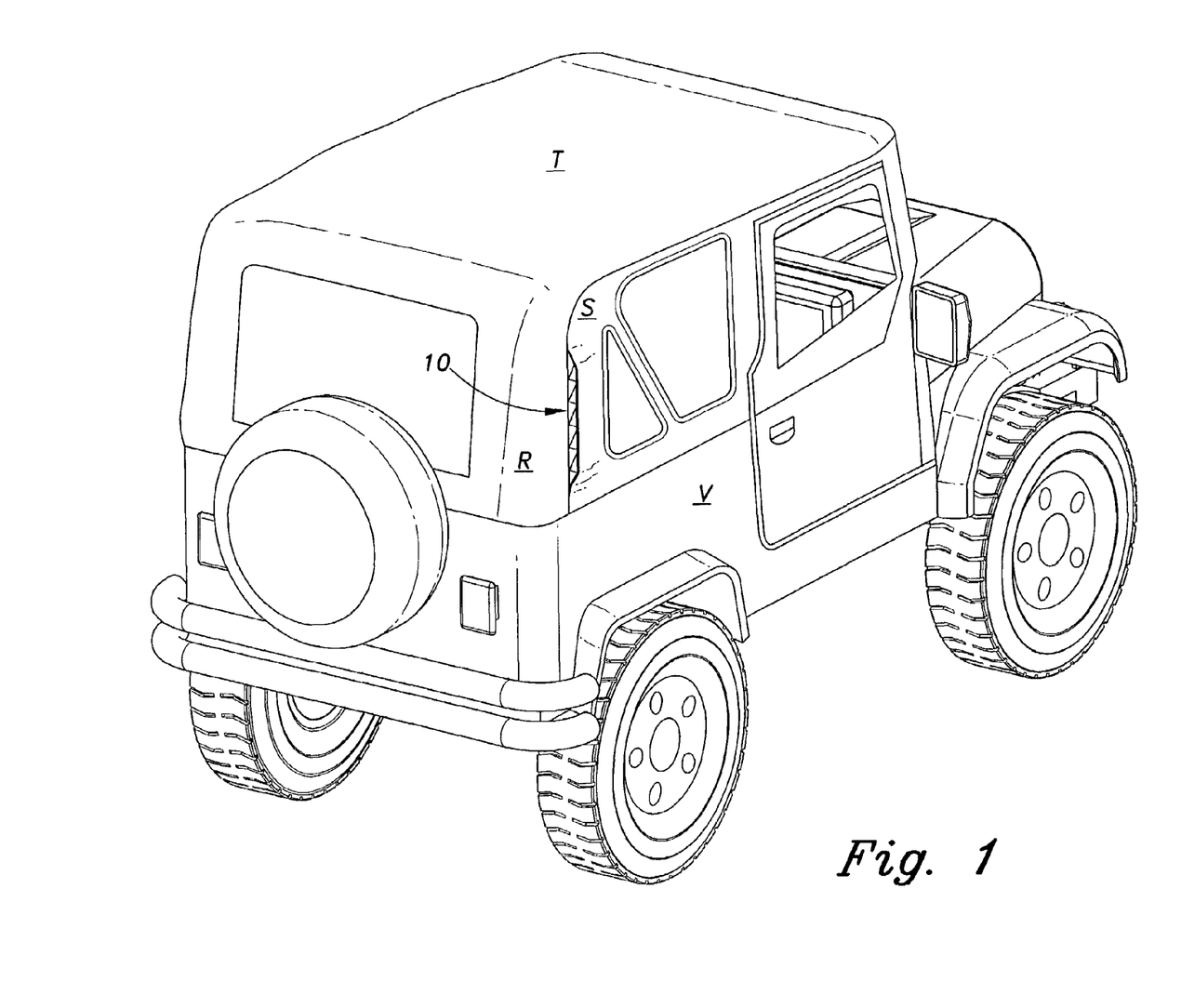
FIG. 1 is an environmental, perspective view of a rear cabin vent for soft top utility vehicles according to the present invention.

Referring to the drawings a vehicle V having a soft top T with a rear wall R and a side flap S has the inventive utility vehicle soft top rear vent generally referred to by the reference number 10. As is seen, the vent 10 is inserted between the rear wall R and the side flap S to allow exit of air introduced through the open front window of vehicle V.

Figure 2:
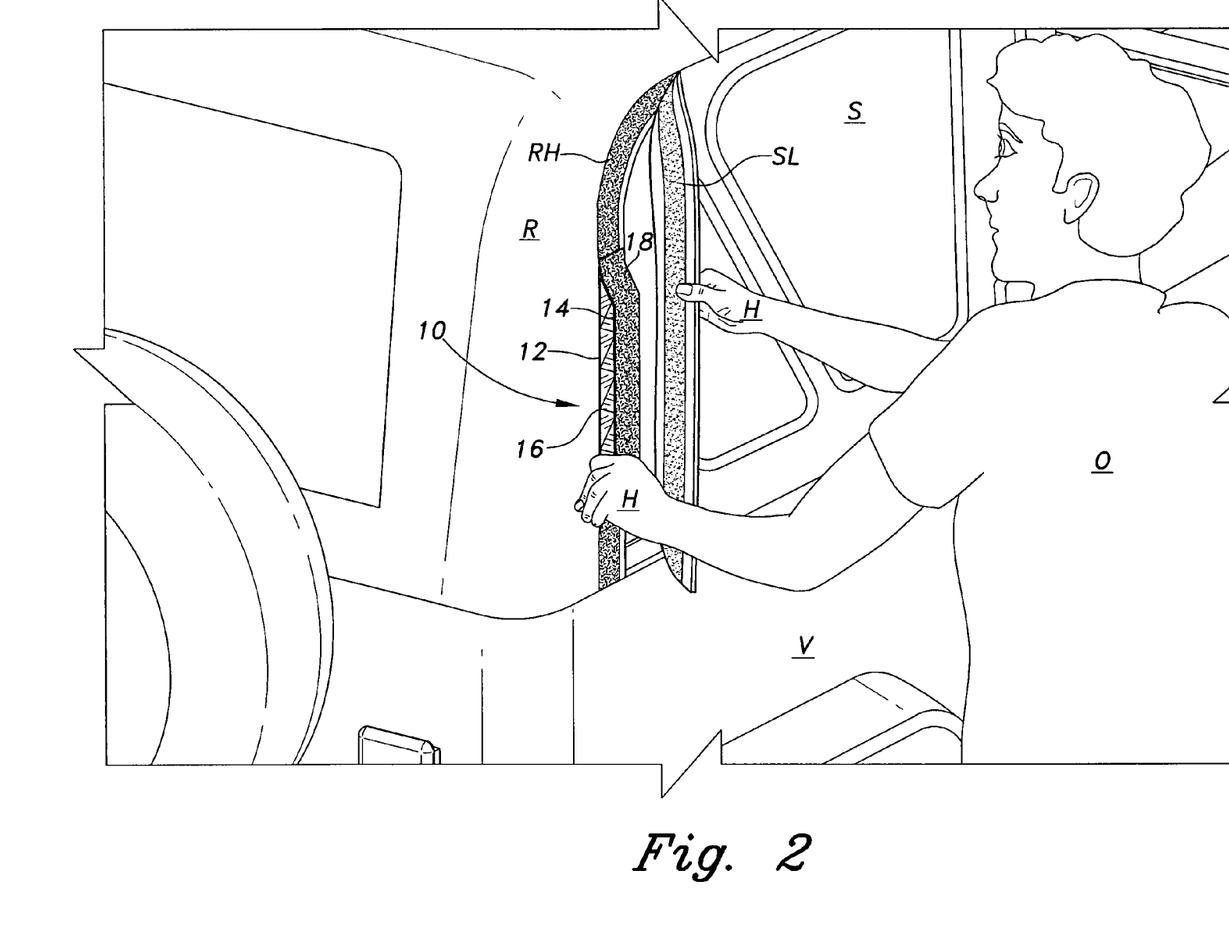
FIG. 2 is an environmental perspective view of a person installing the vent of FIG. 1.
Figure 3:
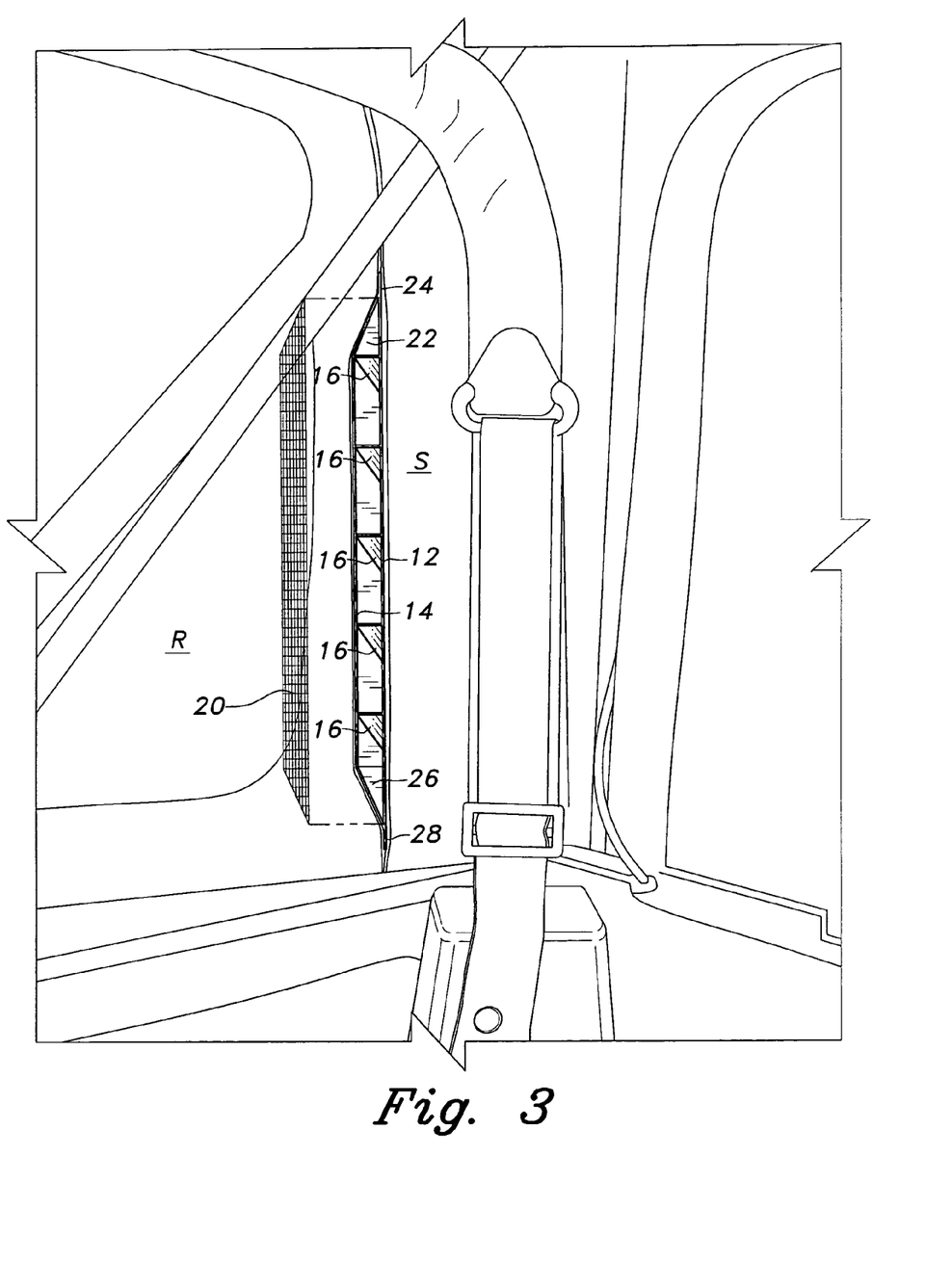
FIG. 3 is a frontal perspective view of the vent of FIG. 1 from within the vehicle cabin with a sent screen cover exploded away.
Figure 4:
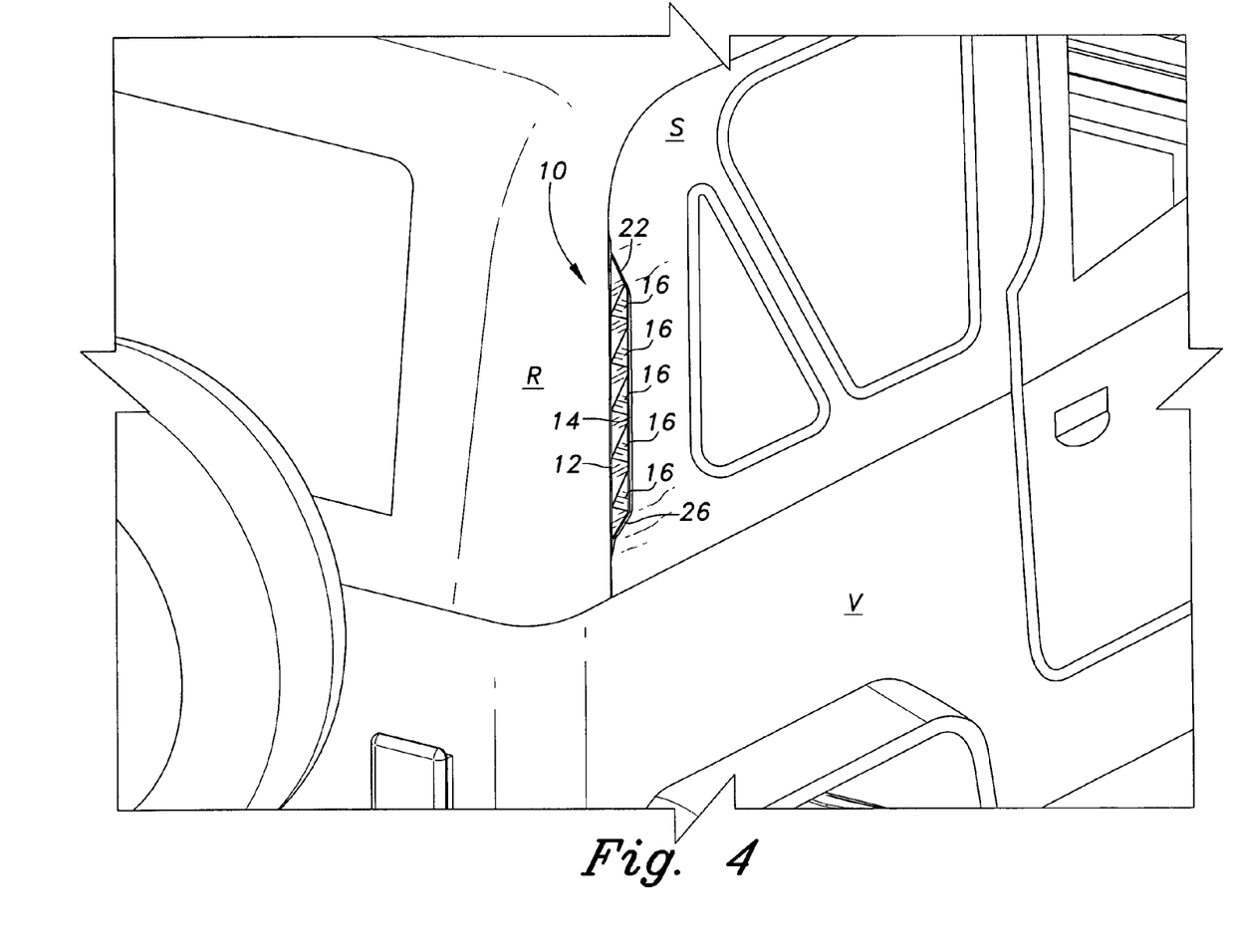
FIG. 4 is rear perspective view of the vent of FIG. 1 from the rear exterior of the vehicle.

As more clearly seen in FIG. 2, the vent 10 has an inner vent wall 12 against the rear wall R and an outer wall 14 spaced from inner wall 12 by rearward, downwardly extending louvers 16. The outer side of outer wall 14 is completely covered by hook material 18 from upper to lower end. The outer side of inner wall 12 has loop material 19 (see FIG. 5) engaged with a rear wall hook material strip RH. The zipper (not shown) has been unzipped from the lower edge to a point near the top of the rear wall R and the matching strip of loop material SL is disengaged from the hook material strip RH. The operator O holds the vent 10 in position with one hand H while grasping the rear flap of soft top side flap S with his other hand H. To complete installation the operator O merely presses the flap loop material strip SL over the exposed strip RH and the hook material 18 of vent 10, thus completing the installation as see from the inner side within the cabin (see FIG. 3 and from the outside of the cabin (see FIG. 4). As seen in FIG. 3, a screen 20 shown exploded away from vent 10 covers the inner side of vent 10.

Figure 5:
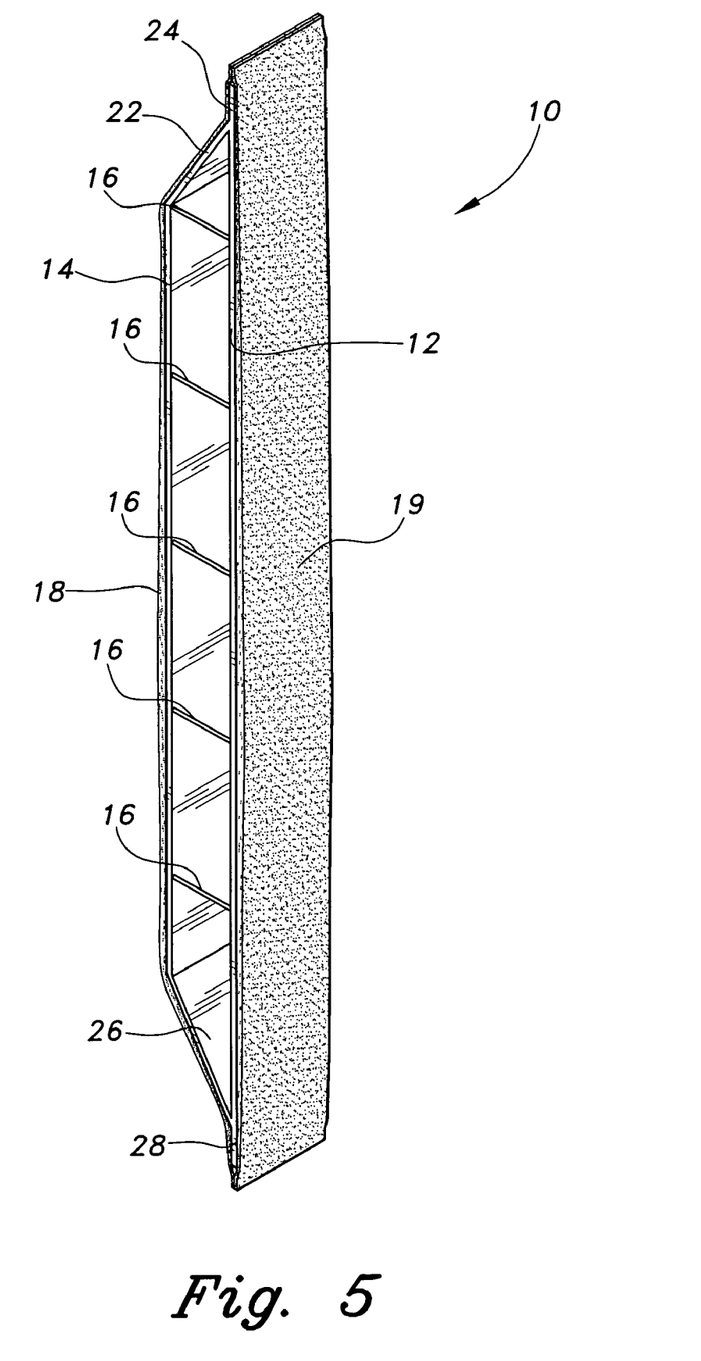
FIG. 5 is a perspective view of the vent element of FIG. 1 showing the inner vent wall as covered with loop material.

Referring to FIGS. 3–8, and, in particular, FIG. 5, inner wall 12 is spaced from outer wall 14 by louvers 16. Hook material 18 and loop material 19 such as Velcro cover the respective outer surfaces of outer wall 14 and inner wall 12. Vent upper end portion 22 includes the upper portion of inner wall 12 and a sloped portion of outer wall 14 forming an upper end vent wall connection 24. Similarly, vent lower end portion 26 includes the lower portion of inner wall 12 and a sloped portion of outer wall 14 forming a lower end vent wall connection 28. The respective upper and lower end portion 22 and 26 may be curved as desired, the goal being a smooth transition between the hook and loop material of the vent 10 and the rear and side flap hook and loop material strips of the soft top T and the side flap S. The inner wall 12 is preferably a planar flat from its lower extreme to its upper extreme, the outer wall 14 being shaped to allow maximum air flow while retaining a smooth interface with the hook material of the side flap strip.

Figure 6:
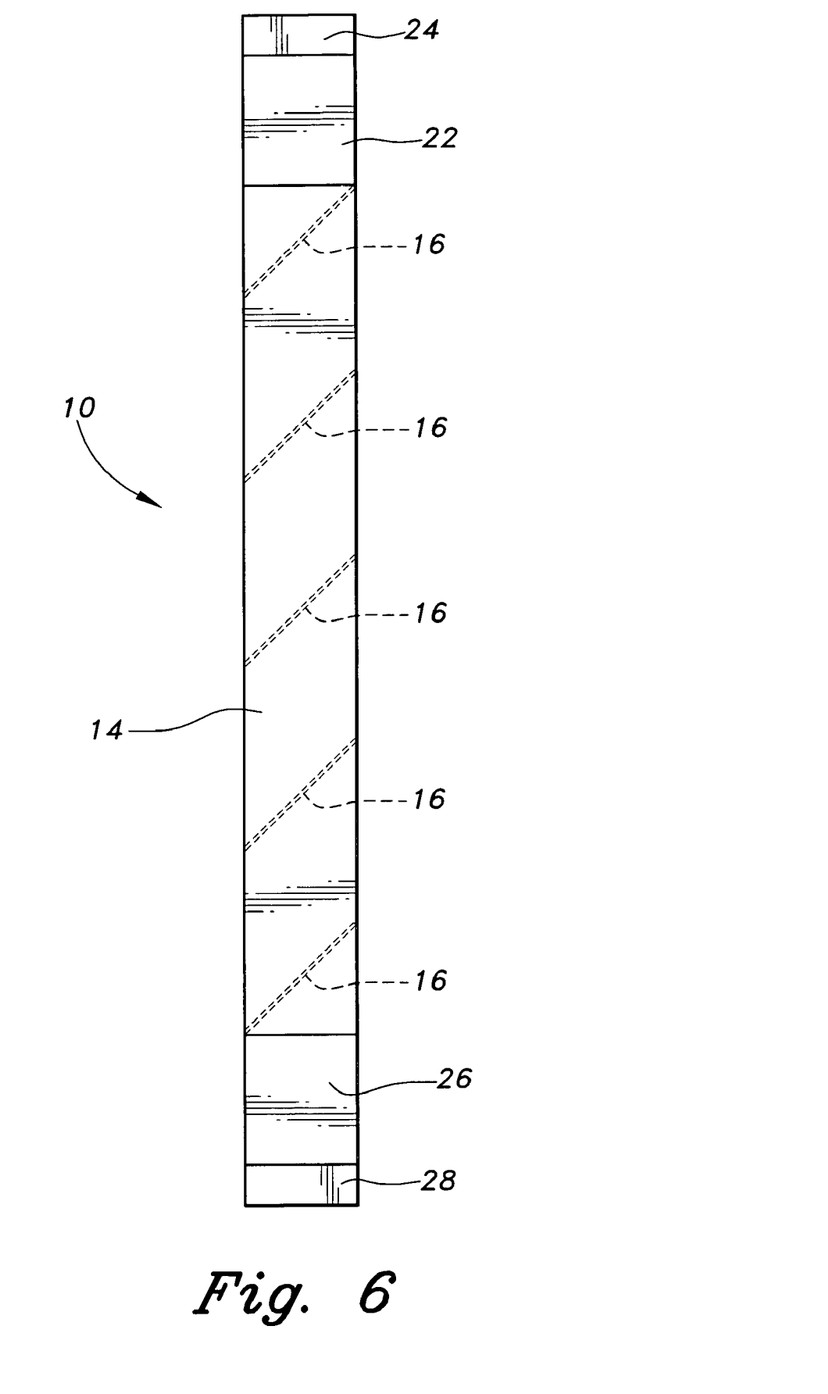
FIG. 6 is a plan view of the vent element of FIG. 1 showing the outer vent wall without the hook or loop material.
Figure 7:
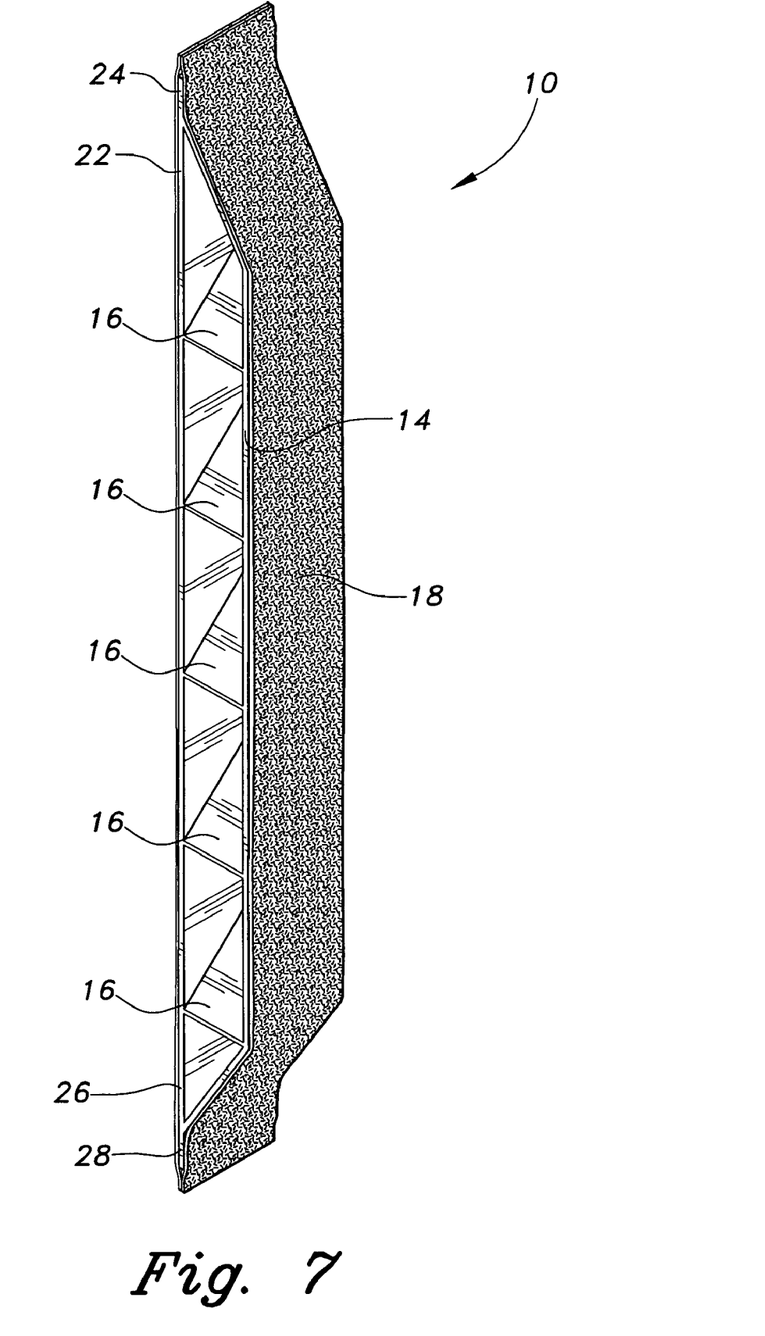
FIG. 7 is a perspective view of the vent element of FIG. 1 showing the outer vent wall as covered with hook material.

As seen in FIG. 6 (shown without hook material) the louvers are angled between the front side (on the right as illustrated) and the rear side (on the left as illustrated). The upper and lower end vent wall connection 24 and 28 may include areas where inner wall 12 and outer wall 14 are sandwiched. This construction is preferred when the vent unit is made of sheet metal. The sandwich areas are unnecessary when the vent is molded of plastic or aluminum.

Figure 8:
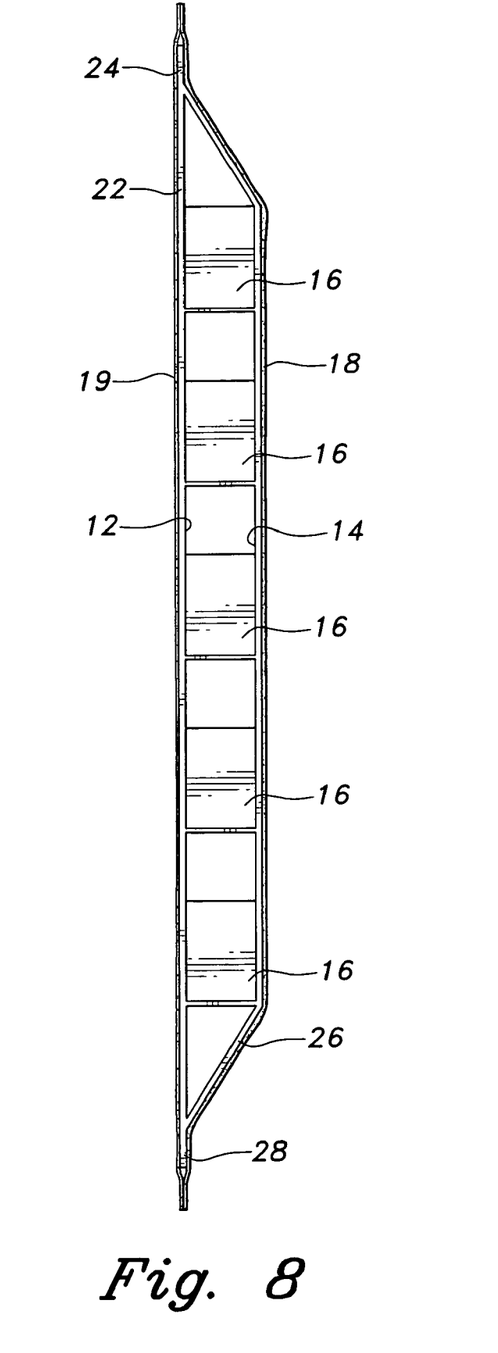
FIG. 8 is a rear elevation view of the vent element of FIG. 1.

Referring to the rear elevation view of FIG. 8, the louvers 16 are so spaced as to provide direct flow openings therebetween to maximized venting capacity. The louvers 16, however, may be more closely spaced as desired depending on the protection from rain desired. The overall length from upper to lower end is about 22 inches with the width between inner and outer walls being about 1 inch. The thickness of the vent (see FIG. 7) between the front air inlet side and the rear air exit side is preferably equal to the width of the soft top and mating side flap hook and loop material, typically about 1 inch.

Referring to FIG. 2, the inventive rear vent may be removed by reversing the steps described above, i.e., the side flap S is pulled away from the vent 10, the vent 10 removed by pulling away from the rear wall of the soft top 10, the zipper pulled down to the close position (not shown), and the respective hook and loop strips of the rear wall and zipper protective flap of the side flap closed against each other.

It is to be understood that the present invention is not limited to the embodiment described above, but encompasses any and all embodiments within the scope of the following claims.

I claim:

1. A soft top rear cabin vent for off road and utility vehicles having comprising:

a vertically oriented inner vent wall having an upper portion and a lower portion;

an outer vent wall parallel to and spaced from said inner vent wall, said outer vent wall having an upper portion and a lower portion;

an upper end portion formed by said outer vent wall joining said inner wall;

a lower end portion formed by said outer vent wall joining said inner wall;

said soft top having a top, a rear wall portion, and a rear side flap portion; and means for inserting and removably attaching said vent between said rear wall portion and said rear side flap portion;

whereby said rear cabin vent promotes air flow from the front of said vehicle, through the interior of the cabin, and out the rear cabin through said rear cabin vent; and whereby said rear cabin vent allows escape of air introduced from an open front window of said vehicle into the cabin to reduce swirling of air within the rear cabin.

2. The vent of claim 1, said inner vent wall having an outer surface and said inner wall having an outer surface, said vent having a front air intake portion and a rear air outlet portion, said outer vent wall being spaced from said inner vent wall by a plurality of downwardly, rearwardly sloping louvers.

3. The vent of claim 2, said vent having an upper end portion defining an upper end of said vent, and a lower end portion defining a lower end of said vent.

4. The vent of claim 3, said upper end portion being defined by said upper portion of said outer wall intersecting with said upper portion of said inner wall.

5. The vent of claim 4, said inner wall being a planar flat, said outer wall upper end portion sloping upward toward said inner wall forming said upper end of said vent at the upper intersection of said outer wall and said inner wall, said outer wall lower end portion sloping downward toward said inner wall forming said lower end of said vent at the lower intersection of said outer wall and said inner wall.

6. The vent of claim 5, wherein said outer surface of said inner wall is covered with one of hook material and loop material, and said outer surface of said outer wall is covered with the other of said hook material and said loop material.

7. The vent of claim 6, wherein said inner air inlet side is covered with screen material so as to exclude insects from the interior of said cabin.

8. The vent of claim 7, wherein said outer side of said inner wall is covered with loop material and said outer side of said outer wall is covered with hook material, said vent being adapted to interfit between the rear wall portion and the rear side flap portion of said soft top.

9. The vent of claim 8, wherein said rear wall portion and said rear side flap portion have cooperating strips of hook material and loop material, respectively, said means for inserting and removably attaching said vent between said rear wall portion and said rear flap portion comprising said loop material on said vent inner wall and said hook material on said outer wall adapted to removably connect with said strips of hook and loop material.

10. The vent of claim 9, wherein the width between said front and said rear of said vent is about equal to the width of said strips of hook and loop material.

11. The vent of claim 10, wherein said vent is integral in construction.

12. The vent of claim 10, wherein said outer surface of said inner wall is completely covered with loop material and said outer surface of said outer wall is completely covered with hook material.

13. The vent of claim 12, wherein said vent is about 22 inches in vertical length and said outer wall is spaced from said inner wall by about 1 inch.

14. The vent of claim 13, wherein said vent is about 1 inch in width between said front and said rear sides.

15. A vent in combination with a soft top for off road and utility vehicles comprising:

a vertically oriented inner vent wall having an upper portion and a lower portion;

an outer vent wall parallel to and spaced from said inner vent wall, said outer vent wall having an upper portion and a lower portion;

an upper end portion formed by said outer vent wall joining said inner wall; and a lower end portion formed by said outer vent wall joining said inner wall;

said soft top having a top, a rear wall portion, and a rear side flap portion;

whereby said rear cabin vent promotes air flow from the front of said vehicle, through the interior of the cabin, and out the rear cabin through said rear cabin vent; and whereby said rear cabin vent allows escape of air introduced from an open front window of said vehicle into the cabin to reduce swirling of air within the rear cabin.

16. The vent of claim 15, said inner vent wall having an outer surface and said inner wall having an outer surface, said vent having a front air intake portion and a rear air outlet portion, said outer vent wall being spaced from said inner vent wall by a plurality of downwardly, rearwardly sloping louvers.

17. The vent of claim 16, said vent having an upper end portion defining an upper end of said vent, and a lower end portion defining a lower end of said vent.

18. The vent of claim 17, said upper end portion being defined by said upper portion of said outer wall intersecting with said upper portion of said inner wall.

19. The vent of claim 18, said inner wall being a planar flat, said outer wall upper end portion sloping upward toward said inner wall forming said upper end of said vent at the upper intersection of said outer wall and said inner wall, said outer wall lower end portion sloping downward toward said inner wall forming said lower end of said vent at the lower intersection of said outer wall and said inner wall.

20. The vent of claim 19, wherein said inner air inlet side is covered with screen material so as to exclude insects from the interior of said cabin.

* * * * *